(No Model.)

G. G. LOBDELL.
CAR WHEEL.

No. 378,844. Patented Feb. 28, 1888.

Witnesses:
David S. Williams
William D. Conner

Inventor:
George G. Lobdell.
by his Attorneys.
Howson & Howson.

UNITED STATES PATENT OFFICE.

GEORGE G. LOBDELL, OF WILMINGTON, DELAWARE.

CAR-WHEEL.

SPECIFICATION forming part of Letters Patent No. 378,844, dated February 28, 1888.

Application filed October 31, 1887. Serial No. 253,866. (No model.)

*To all whom it may concern:*

Be it known that I, GEORGE G. LOBDELL, a citizen of the United States, and a resident of Wilmington, New Castle county, Delaware, have invented certain Improvements in Car-Wheels, of which the following is a specification.

My invention relates, primarily, to that class of car-wheels in which the center or body of the wheel is cast in one piece and the tire is detachably secured to said center or body; and my object is to make the center or body portion light and yet strong, and at the same time to secure the advantage of being able to use one continuous core for shaping the interior of the wheel.

Figure 1:
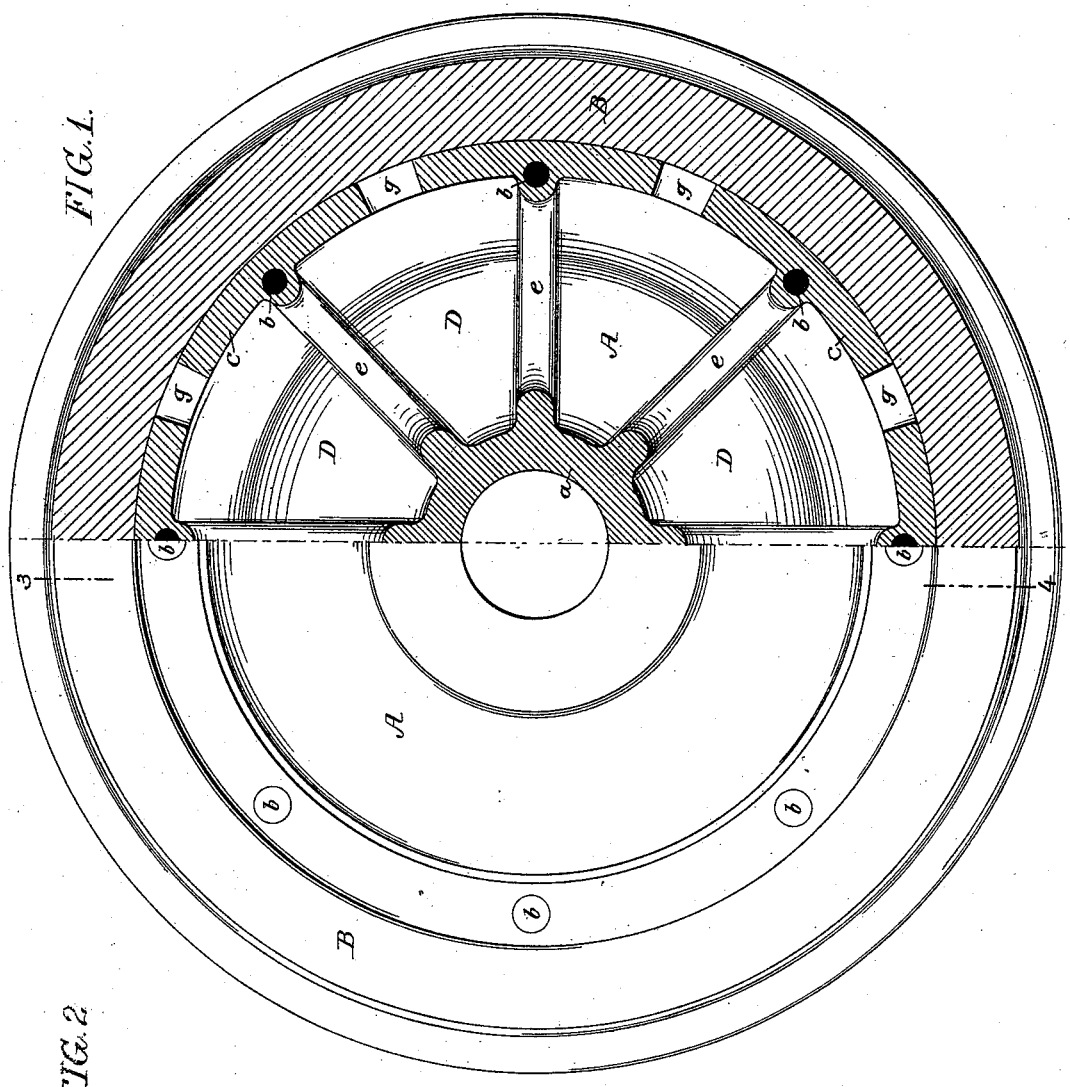
Figure 2:
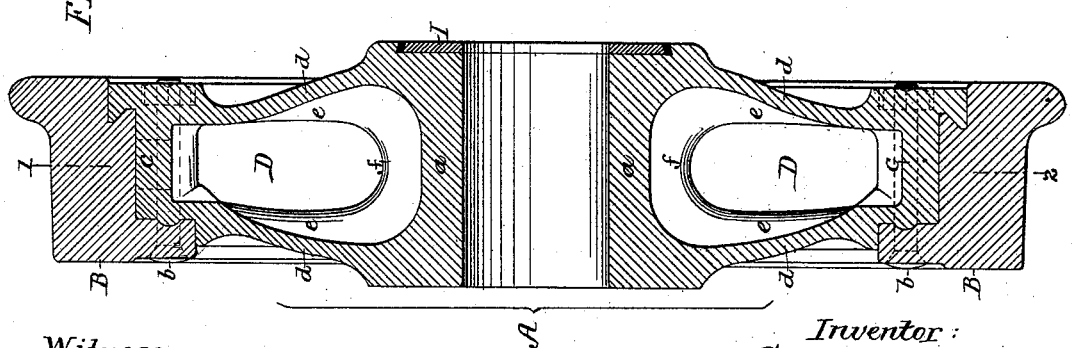

In the accompanying drawings, Figure 1 is a face view of my improved car-wheel, showing one-half of the wheel in section, on the line 1 2, Fig. 2; and Fig. 2 is a transverse section on the line 3 4, Fig. 1.

A is the center or body portion of the wheel, and B is the flange or tire, secured to said body portion in any suitable manner. In the drawings I have shown securing-bolts $b$, passing through a flange on the tire and through the rim of the center or body portion.

Referring to the body portion A, to which my invention particularly relates, $a$ is the hub, $c$ the rim, and $d\,d$ the side plates, these parts being preferably cast in one piece and inclosing an annular space, D. On the inner side of each of the side plates, $d\,d$, is a series of radial ribs, $e\,e$, which are continuations of ribs $f$ on the hub, the ribs $e\,e$, as they near the rim $c$, merging into the side plates. (See Fig. 2.) By this construction I produce a car-wheel which combines great strength with lightness, and at the same time may be easily and cheaply cast.

I am aware that it has been heretofore proposed to cast in a single piece a car-wheel center or body provided with continuous or unbroken sides connected by cross webs or ribs extending from the rim of the hub and dividing the interior into a series of radial chambers. This plan involves the employment of a separate core for each of the chambers into which the interior of the wheel is thus divided, and also the provision of apertures in the hub portion for the proper support and for the removal of each of said cores. In my construction, however, of wheel the ribs $e\,f$, while imparting the desired strength to the wheel, do not form partition-walls therein, and in casting the wheel a single annular core may be employed; nor is it necessary in my construction of wheel to make apertures either in the side plates, $d$, or in the hub portion $a$ for the proper support or for the removal of the core. The core will receive all necessary support from extensions passing through core-openings G in the rim $c$, through which openings, also, the core can be readily removed.

In that face of the hub $a$ of the wheel which bears against the boxes I insert an annular plate, I, of hardened iron, steel, or other metal, to form a suitable wearing-surface. This plate is set into a recess in the face of the hub $a$, as shown in the drawings, said recess being undercut, and of slightly greater diameter than the plate, the edge of which is beveled, as shown. The plate may be secured to the hub by filling the space between the edge of the plate and that of the recess in the hub with lead or other suitable metal.

Other means of securing the plate will readily suggest themselves to those skilled in the art.

It is obvious that the strengthening-ribs $e\,f$ may be varied as to number, form, and proportions without departing from my invention, so long as they serve to impart the desired strength without forming partition-walls within the wheel.

One only of the plates $d$, instead of both, may be provided with ribs $e$; or, instead of having the ribs $e$ on the side plates opposite to each other, as shown in the drawings, the ribs of the one plate may be situated between those of the other.

I claim as my invention—

1. A car-wheel center or body portion consisting of hub, rim, and connecting side plates inclosing an annular space, D, and provided as to the hub and one or both side plates with strengthening-ribs $e\,f$, extending into but not across said annular space D, all substantially as and for the purposes set forth.

2. A car-wheel consisting of a hub, rim, and connecting side plates inclosing an annular space, D, with ribs extending into but not across said annular space D, all substantially as specified.

In testimony whereof I have signed my name to this specification in the presence of two subscribing witnesses.

GEORGE G. LOBDELL.

Witnesses:
CHAS. F. WOLLASTON,
WINFIELD T. McKAIG.